United States Patent Office 2,828,642
Patented Apr. 1, 1958

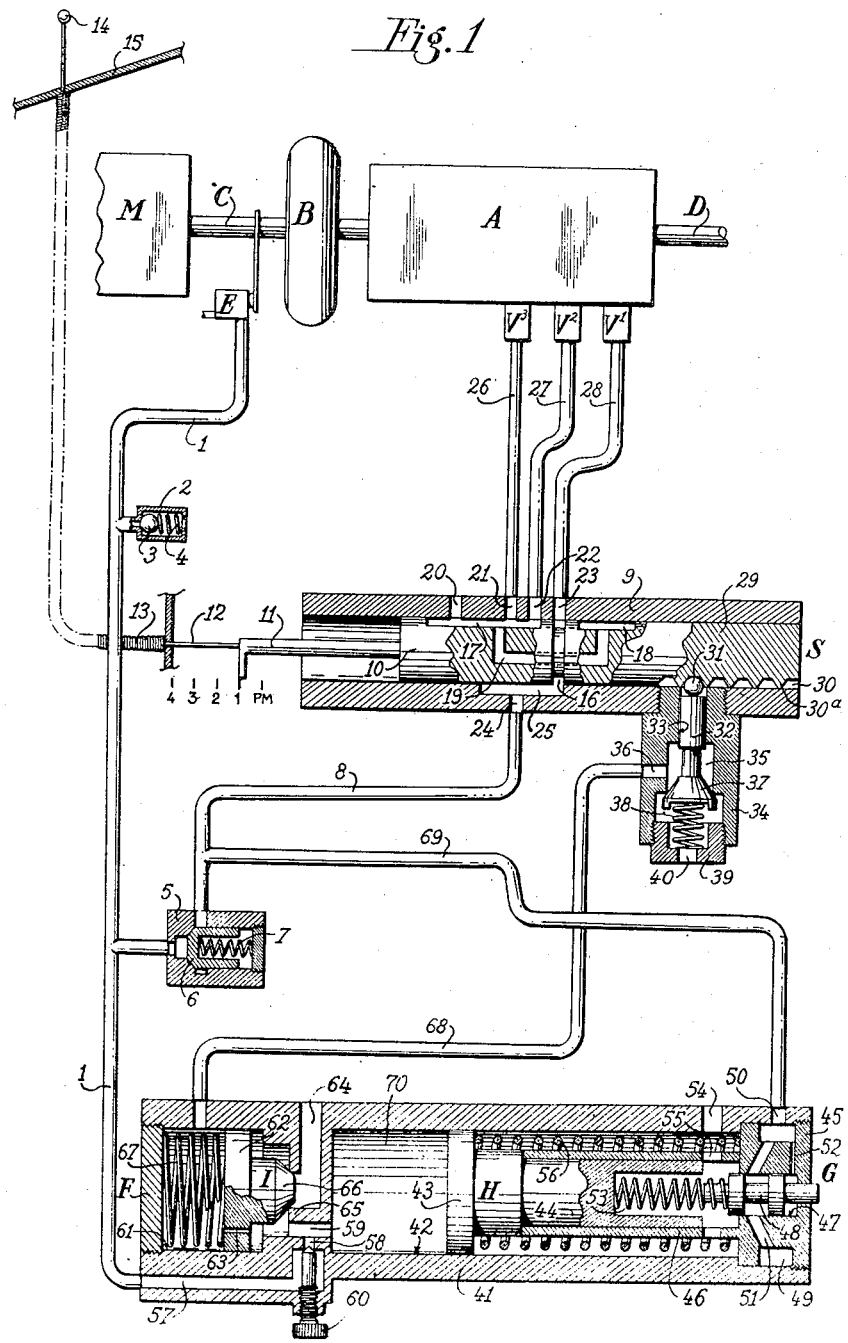

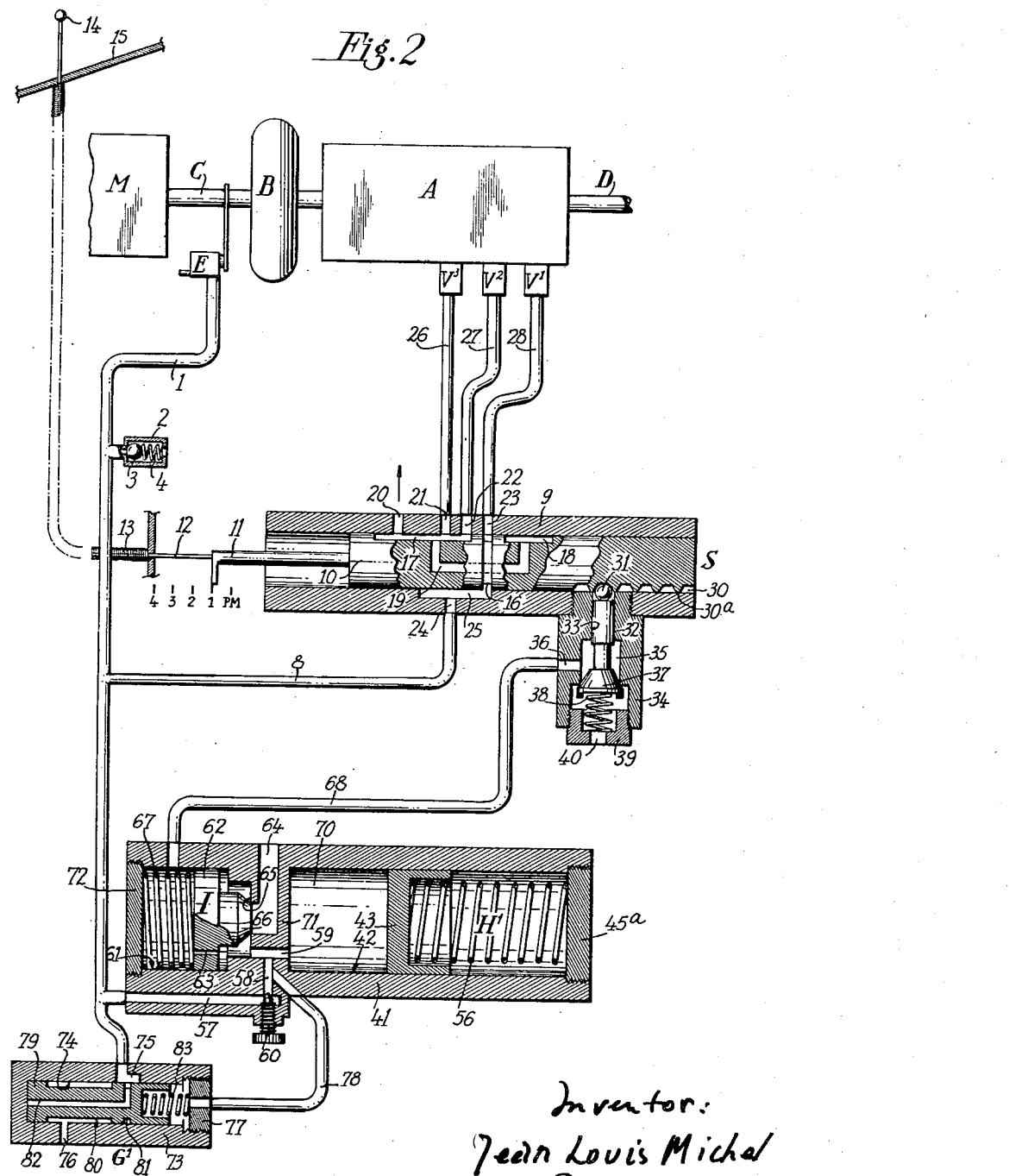

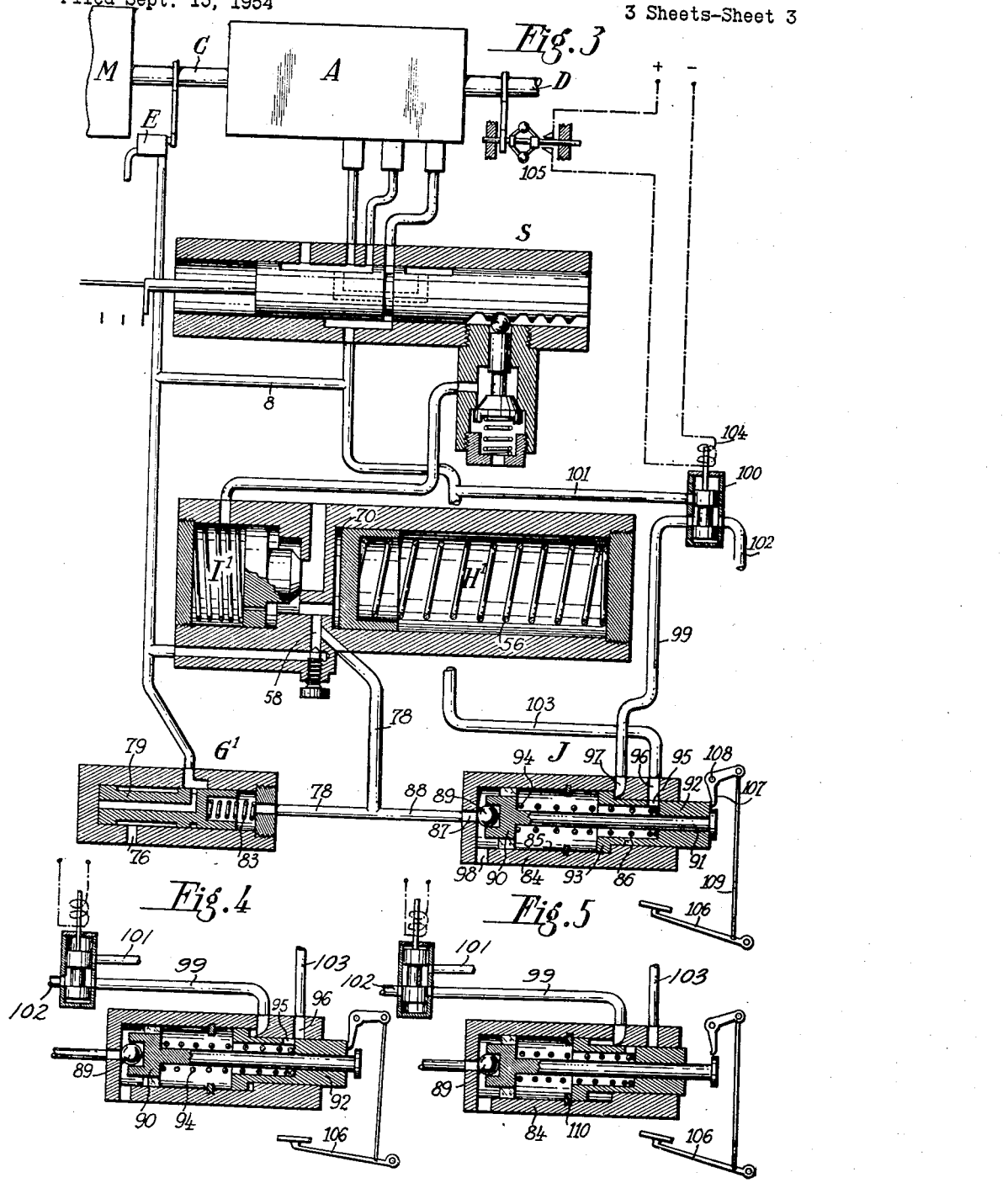

2,828,642

CONTROL DEVICE FOR A TRANSMISSION MECHANISM

Jean Louis Michel Bernard, Pont-a-Mousson, France, assignor to Compagnie de Pont-a-Mousson, Nancy, France, a French body corporate Application September 15, 1954, Serial No. 456,241

Claims priority, application France September 16, 1953

16 Claims. (Cl. 74—472)

The present invention relates to power transmission mechanisms of the type comprising a gear box which has permanently engaged gears and is controlled by hydraulic actuating devices (fluid motors and/or clutches) which are actuated by a fluid under pressure, for example oil.

It has more particularly for object to provide a control device for such a mechanism, this device being of known type which comprises a selector having a slide or other movable member adapted to admit fluid under pressure successively to fluid motors or clutches which actuate the gear box, this device being improved in such manner as to permit the fluid motors or the clutches to be brought into action progressively in accordance with a law which is independent of the volume to be filled and is solely a function of time.

This improved control device is characterized in that in the supply pipe supplying fluid under pressure to the selector is disposed in the form of a by-pass, a main exhaust device the closing of which ensures the pressure rise in the selector, this exhaust device being combined with a retarding control device which is itself under the control of an auxiliary device which is in turn controlled by the movable member of the selector, these three devices being so-constructed and arranged in combination that, on the one hand, the displacement of said member of the selector for the purpose of changing the speed or gear causes the instantaneous opening of the exhaust device, whereas the positioning of said member in any one of the positions corresponding to one of the engaged speeds or gears causes a progressive closure of this exhaust device.

By this means, in the course of any speed or gear change the supply circuit for the fluid motors and/or clutches is firstly suddenly connected to exhaust by the main exhaust device up to a predetermined minimum pressure and thereafter progressively put under pressure, whereby the speed or gear change is effected smoothly.

The invention has for further object to provide a complete transmission unit between a driving shaft driven by a motor and a driven shaft, this unit comprising in combination with a transmission mechanism including a gear box which has permanently engaged gears and is controlled by hydraulic actuating devices, a source of fluid under pressure and an improved control device as described above.

Further objects and advantages of the invention will appear from the ensuing description.

In the accompanying drawing, given merely by way of example:

Fig. 1 is a diagrammatic assembly view of a transmission unit embodying the invention;

Fig. 2 is a similar view of a first modification;

Fig. 3 is a similar view of a second modification with an auxiliary starting device, and Figs. 4 and 5 are sectional views of the auxiliary starting device in the positions respectively corresponding to the start of the acceleration and high speed in respect of the driven shaft.

In the embodiment shown in Fig. 1, the invention is shown applied to the control of a gear box A connected to a hydraulic coupling B which performs the function of a clutch and is disposed between a driving shaft C, driven by a motor M, and a driven shaft D. This gear box A is one of the known types in which the different speeds are each obtained by admitting oil under pressure to one of three fluid motors $V^1$, $V^2$, $V^3$.

This oil under pressure is furnished by a pump E which is driven by the driving shaft C or by the driving member of the coupling B connected with the shaft C. The pump E discharges into a pipe 1 to which are connected in the form or by-passes:

(a) A first or relief valve 2 having a ball 3 and a spring 4 which opens to the exhaust and is set to allow a maximum pressure $P_m$ (to give an example, $P_m$ is of the order of 18 kg./cm.$^2$);

(b) A second or check valve 5 having a valve member 6 which is urged by a spring 7 against the valve seating, this valve member when opened connects the pipe 1 to a pipe 8 which in turn is connected to a selector S.

This selector S, which is of the type including a slide valve, comprises a body 9 in which is longitudinally slidable a slide 10 which is manually operated by means of a rod 11. This rod is preferably connected, by means of a cable 12 enclosed in a sheath 13, to a push-pull rod 14 disposed on the dashboard 15 or in proximity to the driving wheel, if the mechanism is incorporated in the motor vehicle.

The slide 10 comprises an annular recess 16 disposed between two longitudinal grooves 17 and 18 which are interconnected by a passageway 19. This recess and these grooves are adapted to co-operate respectively with four apertures 20, 21, 22, 23 and with a further aperture 24 all of which are connected to a longitudinal groove 25 formed in the body 9. Thus, in each of the longitudinal positions of the slide 10 the recess 16 is, firstly, in communication with the longitudinal groove 25 and, secondly, in communication successively with one of the apertures 21, 22 and 23, the two other apertures being put into communication with the aperture 20 by the grooves 17 and 18. Each position of the selector S corresponds to one speed or gear of the gear box.

The aperture 20 communicates with the housing of the mechanism and constitutes an exhaust aperture. The other apertures 21, 22 and 23 are connected, by pipes 26, 27 and 28, to the fluid motors $V^3$, $V^2$ and $V^1$ respectively, which correspond to the third, second and first speeds of the gear box. The aperture 24 is connected by the pipe 8 and by way of the valve 5 to the pipe 1.

The slide 10 is extended by a portion 29 in which is provided a recess 30 comprising a series of teeth 30$^a$ which form recesses or grooves having similar dimensions, the number of these recesses being equal to the number of positions of the slide. This recess co-operates with a ball 31 which is supported by a piston or plunger 32 which is movable in a bore 33, the axis of which is perpendicular to the axis of the slide 10. This bore is formed in a member 34 attached to the body 9 in such position that for each position of the slide 10 the ball 31 is located between two teeth 30$^a$. The lower end of the bore 33 is enlarged in order to form a chamber 35 which communicates with an aperture 36.

The lower end of the piston 32 is conical so as to form a valve 37 which is capable of closing the lower aperture of the chamber 35. A compression spring 38 is disposed between the valve 37 and a plug 39 which is provided with a hole 40 and is screwed into the member. This spring ordinarily applies the valve 37 against the valve seating.

The pipe 1 is connected to a mechanism F which comprises a main exhaust device G, controlling the pressure in the selector S, a retarding device H, adapted to control this device G, and an auxiliary exhaust device I for controlling the device H, which is under the control of the valve 37 and is thus responsive to the movements of the slide 10 of the selector S.

This mechanism F comprises a body 41 in the mid-part of which is formed a bore or aperture 42 in which is movable a piston 43 provided with a cylindrical extension 44. This piston defines, between its end and the end of the bore 42, a chamber 70 which has a variable volume. At the right end of the body 41 is disposed a plug 45 comprising a tubular extension or skirt 46 in which is slidable the extension 44 of the piston 43.

The main exhaust device G is provided in the plug 45. This plug 45 comprises a bore or aperture 47 in which is slidable a slide valve 48 including two flanges or shoulders separated by a recess.

In the head of the plug 45 is, furthermore, provided an annular groove 49 which communicates, firstly, with an aperture 50 formed in the end of the body 41 and connected by a pipe 69 to the pipe 3, and, secondly, with a series of apertures 51 which are formed in the plug 45 in line with the groove of the slide 48 and communicate with the bore 47. A passageway 52 connects the aperture 51 to the right end of the bore 47 behind the slide 48. The latter is subjected to the action of a spring 53, supported against the extension 44 of the piston 43, and is urged thereby towards the right end of the slide 48, as viewed in Fig. 1. The latter is adapted to connect the groove 49, the pipe 69 and hence the supply circuit of the fluid motors, with an exhaust aperture 54 formed in the body 41, by way of the aperture 51 and apertures 55 provided in the tubular extension 46 of the plug 45. A spring 56, bearing against the plug 45, tends to urge the piston 43 towards the left, as viewed in Fig. 1.

The retarding device H comprises the chamber 70 with its return spring 56. This chamber 70 is in communication with the pipe 1 above the valve 5, with respect to the flow of fluid under pressure, by way of a pipe 57, an aperture 58 and a passageway 59. The aperture 58 is adjustable by a needle valve 60, which constitutes the adjusting member of the retarding device.

The auxiliary exhaust device I, which is adapted to connect the chamber 70 to the exhaust comprises a bore or aperture 61 formed in the left part of the body 41 as viewed in Fig. 1. This bore is divided into a chamber at the right end and a chamber at the left end by a piston 62 provided with a calibrated orifice 63 through which these two chambers intercommunicate. The right end chamber freely communicates with the chamber 70 through the passageway 59 and it may be connected to the exhaust through an exhaust passageway 64. The entrance of this passageway forms a seating 65 for an exhaust valve 66 which is unitary with the piston 62. In the left end chamber is housed a spring 67 which tends to apply the valve 66 on its seating. This chamber is connected by a pipe 68 to the aperture 36 of the exhaust valve carried by the selector S.

The device operates in the following manner:

Let it be assumed that the first speed of the vehicle is engaged. The pump E pumps at its full rate and discharges oil under pressure into all the passageways and pipes. The oil pressure acts:

(a) On the piston 43 which is fully displaced towards the right up to the illustrated position and thus compresses the spring 56 to the maximum extent and, furthermore, compresses the spring 53 of the slide 48 (it should be noted that the compression of the spring 53 is so selected as to be under these conditions equal to the maximum admissible pressure in the fluid motors);

(b) Directly on the right face of the exhaust valve 66 and indirectly through the calibrated orifice 63 on the left face of this valve, so that on account of the additional pressure exerted by the spring 67 and the differential pressure existing on the two faces of the piston, this valve 66 is applied on its seating 65 and the pipe 63 is also under pressure.

When the speed or gear is changed, the displacement of the slide 10 of the selector S causes one tooth 30$^a$ to pass over the ball 31 and there results a momentary opening of the valve 37 to the exhaust 40. This opening connects the pipe 68 and the left chamber between the piston 62 and the end of the bore 61, to the exhaust. Under the action of the pressure prevailing in the chamber 70, the valve 66 is raised off its seating 65 and connects the chamber 70 to the exhaust through the passageway 64. Hence the piston 43, under the action of the spring 56, rapidly moves towards the left and thus fully releases the pressure on the spring 53 of the slide 48.

It should be noted that when the chamber 70 is empty the pressure prevailing in the selector S and in consequence in the fluid motors is equal to that of said spring 53. Indeed, if the pressure exceeds this pressure it forces the right face of the slide 48 (through the aperture 52) and pushes the latter towards the left, which puts the aperture 50 in communication with the exhaust 54 through the apertures 51 until the pressure drops in the pipe 69 and the selector S and the action of the spring 53 is one more preponderant and urges the slide 48 toward the right. The latter therefore permits an adjustment of the pressure in the fluid motors in accordance with the compression of the spring 53, i. e. in accordance with the position of the piston 43 in the bore 42. It will be observed that the minimum compression of the spring 53 is so selected that it maintains in the hydraulic circuit pertaining to the selector S a pre-determined pressure corresponding to the pressure for advancing and rendering the control operative (fluid motor and/or clutches).

When the next speed or gear is engaged, the ball 31 settles in another notch or groove, the valve 37 returns to its seating under the action of the spring 38, and the exhaust valve 66 returns to its seating under the action of the spring 67. As soon as the valve 66 returns its seating 65, the oil, which continues to arrive through the aperture 58 tends to fill the chamber 70.

It will be observed that, owing to the presence of the valve 5, this oil is always under a minimum pressure which depends solely on the pressure setting of the spring 7. This minimum pressure is selected fairly high but nevertheless less than the maximum admissible pressure determined by the valve 2.

Thus the discharge through the aperture 58, which depends on the input pressure (which varies but little) and the adjusted size of the opening of the aperture 58, is itself substantially constant. Hence the chamber 70 is filled at a rate which is substantially independent of the discharge from the pump E, that is the speed of the motor M.

The filling of the chamber 70 causes a displacement of the piston 43 towards the right as viewed in Fig. 1, which causes the progressive compression of the spring 53 controlling the pressure in the fluid motors of the gear box.

Thus, it can be seen that whatever the actual speed of the motor, in the course of any speed or gear change the supply circuit of the fluid motors is, firstly, suddenly connected to exhaust, as has been explained above, and thereafter progressively put under pressure within a period of time which is predetermined and adjustable to the desired value (by adjusting the needle valve 60). This period of time is independent of the volume of the fluid motors and the speed of the motor, the retard or delay thus obtained permitting a smooth speed or gear change.

Referring now to Fig. 2 which illustrates a first modification of the transmission unit embodying the invention, the arrangement of the selector is identical to the foregoing arrangement. The retarding device H¹ is simplified in that its piston 43 bears against the plug 45ª through the medium of the spring 56. The exhaust device I is identical.

The main exhaust device G¹ comprises a body 73 provided with a bore or aperture 74. In the mid-part of the wall of the latter is provided a groove 75 connected to the pipe 1 and on the left side of the bore 74 is provided an exhaust aperture 76. At the other end, the bore 74 is closed by a screwed plug 77 through which extends a pipe 78 which is connected, in the form of a by-pass, to the passageway 57 of the device H¹ below the needle valve 60, with respect to the flow of the fluid under pressure.

In the bore 74 is slidable a slide valve 79 which is provided with an annular recess 80 and a groove 81 provided in the flange situated between the recess 80 and the end of the slide adjacent the plug 77. This groove 81 is connected, by a longitudinal passageway 82, to the opposite face of the slide 79. The latter is subjected to the action of a spring 83 which bears against the plug 46 and is so constructed and arranged as to exert a pressure $P^1$ on the slide, for example of the order of 0.3 kg./cm.² This pressure may be adjusted by suitably screwing the plug 77.

It will be observed that the length of the groove 75 and its position in relation to the recess 80 and the groove 81 are such that when the slide 79 is pushed home towards the right, as viewed in Fig. 2, the groove 75 communicates with the recess 80 and the groove 81, whereas for the extreme left position of the slide (illustrated position), communication between the groove 76 and the groove 75 is cut off.

The device operates in the following manner:

Let it be assumed that the motor is stationary and the selector S is in the position shown in Fig. 2, which corresponds to engagement of the first speed or gear. The slide 79 is urged to its neutral position at the left solely under the action of the spring 83. The exhaust aperture 76 is therefore closed by the slide. The other exhaust aperture 40, controlled by the slide of the selector, is also closed, the valve 37 being applied against its seating by the spring 38. The valve 66 closes the exhaust passageway 64 under the action of the spring 67, and, as the piston 43 is held at the end of its travel towards the left by the spring 56, the volume of the chamber 70 is nil.

As soon as the motor of the vehicle is started up and runs slowly, the pump E pumps oil which rapidly fills the pipes 1 and 8, which it will be assumed are as short as possible. Owing to the fact that the two exhaust apertures 40 and 76 are closed, there is no escape of fluid and the pressure P of the oil pumped by the pump E rises very rapidly and assumes the same value in the pipes and passageways at a given instant (provided the volumes of the passageways and pipes do not vary and the escapes are closed).

It should be mentioned that the pump E should be so designed that whatever its rotary speed, it is capable of supplying oil at the maximum pressure $P_m$ (regulated by the valve) when all the exhausts are closed.

As soon as the pressure in the pipes exceeds the value $P^2$, oil flows from the passageway 57 to the passageway 58 whence this oil reaches the chamber 70 of the device H¹. On account of the increased supply of oil, the piston 43 moves to the right. The flow of oil to the chamber 70 depends on the adjustment of the needle valve 60 and on the pressure difference below and above the needle, this pressure difference being equal to the pressure setting of the spring 83 whatever pressure prevails in the pipe 1.

The right face of the slide 79 is subjected to an oil pressure $p^1$ which is equivalent to that prevailing in the chamber 70 increased by the pressure $p^2$ exerted by the spring 83. Furthermore, the left face of the slide 79 is subjected to the pressure P which attains this face through the groove 75, the recess 80 and the passageway 82. It is therefore in equilibrium between these two opposing actions.

As soon as pressure P exceeds $(p^1+p^2)$, the slide 79 moves to the right and uncovers a small passageway between the recess 80 and the groove 75 which communicates with the exhaust 76 and lowers the pressure P. If, on the other hand, the pressure increases on the right face of the slide, the latter moves to the left so as to close the exhaust. Thus the relationship $P-p^1=p^2$ is obtained. As the pressure $p^1$ is adjusted by the compression of the spring 56 of the chamber 70, it can be seen that the slide 79, during the whole period of filling this chamber, constantly regulates the pressure P in the pipes 1 and 8 to a value which balances the pressure $p^1$ of the spring 56 of the chamber 70 added to the pressure $p^2$ of the spring 77. As the rate of filling the chamber 70 depends on the pressure $p^2$, which is constant, it can be seen that the rate of filling the chamber is independent of the value of the pressure P due to the pump and which prevails in the pipes and passageways. In the course of filling the chamber, the oil passes through the calibrated orifice 63 and fills the left hand chamber of the bore 61 as well as the pipe 68 and the chamber 35. The pressure of the oil is therefore established on the left face of the piston 62 and is added to the pressure of the spring 67, so that the passageway 64 is maintained closed.

However, the vehicle is started up by progressively increasing the operational pressure of the speed or gear engaging means. It will be supposed that the gear box is changed from first to second speed by operating the rod 14. When the slide of the selector is shifted, the ball 31 is depressed owing to the passage of a tooth 30ª. This causes the valve 37 to open and connects the pipe 68 to the exhaust through the aperture 40 and likewise connects the right hand chamber between the piston 62 and the end of the bore 61 to the exhaust. Under the action of the pressure prevailing in the chamber 70, the valve 66 is raised off its seating and connects the chamber 70 to the exhaust by way of the aperture 64. Hence the piston 43 is rapidly shifted to the left under the action of the spring 56 and thus empties the chamber 70 and a drop in the pressure in the pipe 78 occurs.

It will be observed that, during the emptying of the chamber 70, the oil is incapable of rapidly passing through the calibrated orifice 63 and thus compensating the quantity discharged through the aperture 40. Hence there results, until the chamber is completely emptied, an unbalance of pressure on the two faces of the piston 62 and the exhaust 64 is maintained open.

Owing to the pressure drop in the pipe 78, the slide 79 of the device G¹ has its right face subjected to the single pressure $p^2$ of the spring 83, which is less than the pressure P prevailing on the left face. The slide is therefore urged to the right under the action of the pressure difference $P-p^2$. The groove 75 is put into communication with the exhaust aperture 76 by way of the recess 80 and the pipes 1 and 8 remain connected to the exhaust so long as the pressure P prevailing therein exceeds $p^2$.

As soon as the pressure P in the pipes falls to a value less than $p^2$, the slide 79 resumes its first position to the left, owing to the action of the spring 83 and thus closes the exhaust aperture 76. From this moment the pressure increase occurs once more in a manner identical to that described with reference to Fig. 1, except that the oil is admitted to the fluid motor V², which engages the second speed or gear.

Thus, it is clear that in the course of passing from one gear or speed to another a pressure drop occurs by means of which the fluid motor that was previously actuated is rendered inoperative, the next fluid motor to come into action being itself inoperative, as it is not yet subjected to pressure. Thus the gear box A is rendered inoperative and this ensures that the fluid motors pertaining to two different speeds or gears are never simultaneously under pressure, that is operative. Furthermore, the increase in pressure of the oil in any of the fluid motors and in consequence its actuation is obtained progressively in accordance with a pre-determined law which is independent of the discharge from the pump and also independent of the volume to be filled in the various fluid motors. Thus, by means of the mechanism of the invention the speeds or gears are changed smoothly.

According to the modification shown in Figs. 3 to 5, the device of the second example is completed by an auxiliary device J which is adapted to arrange that the increase in pressure at the moment of a starting up the motor and the maximum possible pressure in the accelerating devices are responsive to, that is controlled by, the load on the motor. This enables the clutch device, such as the hydraulic coupling B of the first two examples, to be eliminated.

The transmission unit is identical to that of the example shown in Fig. 2 except that a by-pass includes the starting device J and is connected to the pipe 78.

The starting device J comprises a body 84 provided with two co-axial bores or apertures 85 and 86 having different diameters. The bore 85, which has the larger diameter, communicates with the pipe 78 through an aperture 87, and a pipe 88. The aperture 87 is capable of being closed by a ball 89 which is disposed in front of a castellated or notched piston 90. The stem 91 of the piston extends through the end of a sleeve 92 which is slidably mounted in the bore 86 and is provided with a flange 93 which forms a piston in the bore 85. Between the inner end of the sleeve 92 and the piston 90 is disposed a spring 94 which is initially subjected to a certain compression which corresponds to the oil pressure in the mechanism when the chamber 70 is empty i. e. to the pressure $p^2$ of approach of the actuating means for the gear box. In the wall of the sleeve 92 is provided an aperture 95 which is adapted to co-operate with an aperture 96 formed in the body 84. Behind the flange 93 of the sleeve 92 is disposed another aperture 97 at the level of the shoulder separating the bores 85 and 86. An exhaust aperture 98 is provided below the ball valve 89, with respect to the flow of the fluid under pressure.

The aperture 97 is connected, by a pipe 99, to a three-way valve 100. One of the passageways from the valve 100 is connected to the pipe 8 by a pipe 101, and a second passageway is connected to the exhaust at 102. The third passageway is connected to the pipe 99.

The aperture 96 is connected by a pipe 103 to the pipe 101 above the valve 100 with respect to the fluid flow. This valve 100 is controlled by a device of known type, for example a relay 104 fed by a centrifugal switch 105 which is driven by the output shaft D of the gear box or by any other device which is responsive to the speed of the vehicle, so that if the speed of the vehicle is less than a pre-determined speed (for example 20 km./h.), the aperture 97 is connected to the exhaust, whereas for a speed in excess of this value this aperture 97 is connected to the pipe 8.

The sleeve 92 may be moved to the left in accordance with the depression of the accelerator pedal 106 of the motor M by means of a bell crank 107 which is pivotably mounted on a fixed pivot pin 108 and is connected to the accelerator pedal by a connecting rod 109.

An abutment 110 is provided in the bore 85 and the flange 93 enters into contact with this abutment when the accelerator pedal is fully depressed. In this position, the spring 94 is compressed to the maximum extent and applies the ball 89 onto its seating with such force that it corresponds to the maximum admissible pressure $P_m$ in the pipes. Thus it is clear that for any intermediate position of the accelerator pedal, the spring 94 would be compressed to an extent that corresponds to an oil pressure comprised between $P^2$ and $P_m$.

The device operates in the following manner:

It will be noticed that when travelling at slow speed with the accelerator released (Fig. 3), the ball 89 closes the aperture 87 only under the action of the spring 94, which is expended to the maximum extent. The oil from the pipe 78 which enters through the aperture 87 is therefore capable of urging the ball 89 off its seating and escapes to the exhaust through the aperture 98. The pressure prevailing in the pipe 78 is equal to $p^2$, that is the pressure exerted by the spring 83 of the device $G^1$.

As soon as the accelerator 106 is depressed, the resultant slight inward movement of the sleeve 92 urges the piston 90 to the left, through the medium of the spring 94, and thus applies the ball 89 more firmly on its seating. At this moment the aperture 95 is in registry with the aperture 96 and the full fluid flow from the pump E escapes from the pipe 103 to the exhaust 98 through the notches in the end of the piston 90.

The following operational conditions will now be examined.

(1) *Sudden acceleration.*—If the motor is suddenly fully accelerated, the bell crank 107 controlled by the accelerator causes the sleeve 92 to be displaced to the left so that the ball 89 closes the aperture 87 with a force that corresponds to the maximum compression of the spring 94, which is for example regulated to the value $P_m$. At this moment the aperture 95 is no longer in registry with the aperture 96 (Fig. 4) and the fluid flow to the exhaust ceases and the mechanism returns to its position shown in Fig. 1. The increase in pressure is retarded by the period of time required to fill the chamber 70 of the device $H^1$. Thus, the vehicle is rapidly but not suddenly put in motion and as the power of the motor is maximum there is no danger of seizing the latter.

(2) *Slow acceleration, the oil having normal viscosity.*—As the pedal 106 is depressed the power of the motor is increased together with its speed and in consequence the discharge from the pump E increases.

It will be observed that for a given position of the accelerator pedal corresponding to a certain compression of the spring 94 and to a given load on the motor, the value of the pressure that may be obtained in the pipes is limited to the oil pressure necessary to raise the ball 89 off its seating. In other words, the filling of the chamber 70 is limited to such pressure that this pressure added to the compression $p^2$ of the spring 83 is equal to the compression of the spring 94. At this moment the device J performs the function of a safety valve.

Further, the cross-section of the passageway between the apertures 95 and 96 decreases, which results in a decrease in the exhaust rate.

It should be noted that as soon as the pressure below the device $G^1$, with respect to the fluid flow, attains a value $p^1=P-p^2$ (P being the pressure above the device $G^1$) the slide 79 closes the exhaust aperture 76. Hence the sole escape to the exhaust is that through the starting device J at 96, 95 towards 98.

In these circumstances the pressure prevailing in the pipes is automatically regulated to the load on the motor. Indeed, if the motor races, the discharge from the pump increases, the loss of pressure due to the fluid escape at 96—95 increases, the pressure increases in the pipes 1, 8, 103 and the fluid motors operate. If this pressure increases too much, the increase in the torque causes a decrease in the speed of the motor and in consequence a decrease in the discharge from the pump which results in a decrease in the pressure and hence a decrease in the operative force exerted by the fluid motors.

Thus it is clear that by means of the starting device J it is possible to put the vehicle in motion as gently as it is desired without any risk of stalling the motor, since the pressure in the fluid motors adjusts itself in accordance with the speed and in consequence with the available power from the motor.

(3) *Cold starting with viscous oil.*—If the mechanism has been adjusted for oil having a normal viscosity and the oil is more viscous than the latter, the pressure in the pipe 78 might exceed that which the ball 89 is capable of withstanding for a given adjustment of the position of the sleeve 92. In this case the ball 89 rises off its seating and puts the pipe 88 in communication with the exhaust 98 and thus creates a slow escape of fluid and brings the pressure to the regulated value by compressing the spring 94. The ball 89 performs the function of a safety valve and replaces the valve 2 of Fig. 2 not only at this moment but subsequently when the pressure P attains and tends to exceed the pressure $P_m$ given by the complete compression of the spring 56 or of the spring 94.

It will be noticed that after a certain speed V the centrifugal switch 105 causes a displacement of the slide of the valve 100, which causes the pressure P to be admitted behind the flange 93 of the sleeve 92 (Fig. 5) and the latter is displaced up to the abutment 110 and maintains the ball 89 on its seating, the spring 94 having been compressed to the maximum extent.

The starting device is then inoperative and the unit is in fact returned to its position shown in Fig. 2, the ball 89 still performing the function of a safety valve for the pressure $P_m$. If the speed falls below V, the valve 100 is once more connected to the exhaust 102 and the valve of the starter once more acts in accordance with the depression of the accelerator pedal 106 and, if the latter is released, the clutch is released and the vehicle is free wheeling.

Although several specific embodiments of the invention have been described above and illustrated in the accompanying drawings, it must be understood that many changes and modifications may be made therein to suit different requirements without departing from the spirit of the invention and the scope of the appended claims.

Having now described my invention what I claim as new and desire to secure by Letters Patent is:

1. Control device for controlling a power transmission mechanism which includes a gear box and hydraulic actuating device for controlling said gear box, this control device comprising in combination: a source of a fluid under pressure, a supply pipe for the fluid under pressure discharged by said source, a selector provided with a movable member for connecting the supply pipe successively to each of said actuating devices, a main exhaust device connected to this supply pipe, a retarding control device for controlling the main exhaust device so that its opening is instantaneous and its closure is progressive, and an auxiliary device which is itself controlled by said movable member of the selector, these three devices, the main exhaust device, the retarding device and the auxiliary device, being so constructed and arranged in combination that the displacement of said movable member of the selector for the purpose of changing speed causes, by means of said retarding control device, the instantaneous opening of said main exhaust device which insures an immediate pressure drop in said hydraulic actuating devices, whereas the positioning of said movable member in any of the positions corresponding to one of the engaged speeds causes a progressive closure of this main exhaust device, which insures a progressive pressure increase in said hydraulic actuating devices.

2. Motor-transmission unit comprising in combination: a motor, a driving shaft driven by the motor, a driven shaft, between these two shafts a gear box, hydraulic actuating devices for controlling said gear box and a control device as claimed in claim 1 for controlling said actuating devices.

3. Control device for controlling a power transmission mechanism which comprises a gear box, hydraulic actuating devices for controlling said gear box, this control device comprising in combination: a source of a fluid under pressure, a supply pipe for the fluid under pressure discharged by said source, a relief valve in this supply pipe for limiting the maximum pressure supplied by this source, a check valve in this supply pipe below the relief valve with respect to the fluid flow, a selector provided with a movable member for connecting the down-stream side of the check valve successively to each of said actuating devices, a main exhaust device connected to the supply pipe between said check valve and said selector, a retarding control device for controlling the main exhaust device, so that its opening is instantaneous and its closure progressive, and an auxiliary device itself controlled by said movable member of the selector, these three devices, the main exhaust device, the retarding device and the auxiliary device, being so constructed and arranged in combination that the displacement of said movable member of the selector for the purpose of changing speed causes by means of said retarding control device the instantaneous opening of said main exhaust device, whereas the positioning of said movable member in any of the positions corresponding to one of the engaged speeds causes a progressive closure of the main exhaust device.

4. Control device for controlling a power transmission mechanism which includes a gear box, hydraulic actuating devices for controlling said gear box, this control device comprising in combination: a source of a fluid under pressure, a supply pipe for the fluid under pressure into which this source discharges; a pressure-limiting valve in this supply pipe; a selector provided with a movable member for connecting this supply pipe successively to each of said actuating devices; a main exhaust device comprising a distributor, which includes a body provided with a housing which is connected to said supply pipe and is provided with an exhaust aperture and a distributor member movable in this housing between a first position in which this pipe is isolated from the exhaust aperture and a second or exhaust position in which this pipe and in consequence the selector, are connected to the exhaust through this aperture, a retarding control device for controlling the position of the movable member of the main exhaust device so that the opening of said exhaust device is instantaneous while its closure is progressive, and an auxiliary device which is controlled by said movable member of the selector, these three devices, the main exhaust device, the retarding control device, and the auxiliary device, being so constructed and arranged in combination that the displacement of said member of the selector causes by means of said retarding control device the instantaneous opening of said main exhaust device, whereas the positioning of said member in any of the positions corresponding to one of the engaged speeds causes a progressive closure of the main exhaust device.

5. Control device for controlling a power transmission mechanism which includes a gear box, hydraulic actuating devices for controlling said box, this control device comprising a combination: a source of fluid under pressure, a supply pipe for the fluid under pressure into which the source discharges; a pressure limiting valve in this supply pipe; a selector provided with a movable member for connecting this supply pipe successively to each of said actuating devices, a main exhaust device, comprising a distributor including a body having a housing which is connected to said supply pipe and is provided with an exhaust aperture and a distributing member, movable in this housing between a first position in which said supply pipe is isolated from said exhaust aperture and a second or exhaust position in which said supply pipe and in consequence the selector are connected to exhaust through said aperture; a retarding control device for controlling the position of this movable member of this main exhaust device so that the opening of said main exhaust device is instantaneous while its closure is progressive, said retarding control device comprising a chamber, one of the walls of which is movable so as to vary the volume of this chamber, a yieldable return device for displacing this wall in the direction corresponding to a decrease in the volume of this chamber, a pipe between this chamber and said supply pipe and means for creating in this pipe an adjustable choke aperture; and an auxiliary device which is itself controlled by said movable member of the selector, these three devices, the main exhaust device, the retarding control device, and the auxiliary device, being so constructed and arranged in combination that the displacement of said member of the selector, causes by means of said retarding control device the instantaneous opening of said main exhaust device, whereas the positioning of said member in any of the positions corresponding to one of the engaged speeds causes a progressive closure of this main exhaust device.

6. Device as claimed in claim 5, wherein the auxiliary device which controls the retarding device which is itself controlled by the movable member of the selector, constitutes a rapid exhaust device for said chamber and comprises an exhaust valve which opens rapidly so as to put this chamber in communication with the exhaust, and a pilot valve controlled by said movable member of the selector, controls said quick-opening valve.

7. Device as claimed in claim 6, wherein said rapid exhaust device comprises a cylinder in which said quick-opening valve defines two chambers, one of which is in communication, firstly, permanently with the variable chamber of the retarding device, and, secondly, with the exhaust through an aperture controlled by this quick-opening valve, whereas the other chamber communicates with the first chamber through a calibrated orifice, contains a yieldable device which is adapted to apply the valve on said aperture, and is in communication with the exhaust through an aperture controlled by said pilot valve.

8. Device as claimed in claim 7, wherein said pilot valve is combined with: a hollow body provided with an exhaust aperture, a pipe connecting said other chamber of the rapid exhaust device to said body into which said pipe discharges through said aperture, the pilot valve controlling the communication between the aperture and said exhaust aperture, a spring for returning this valve to the closing position, and a member interposed between this valve and a longitudinally extending face of the movable member of the selector, this face being provided with as many notches as there are positions for said movable member, and these notches and the teeth which separate them being so disposed and arranged that the quick-opening discharge valve is closed when the member, interposed between the pilot valve and the movable member of the selector, is in one of the notches, and opens when this member passes over a tooth.

9. Device as claimed in claim 5, wherein the chamber of the retarding control device comprises a cylinder in which said movable wall is constituted by a piston, the main exhaust device comprising a cylinder in which is displaceable the movable member forming the slide, this cylinder being disposed in the extension of the cylinder of the retarding device beyond said piston and being connected to said supply pipe at its end distant from said piston and a yieldable device being interposed between the slide and the piston so that when said supply pipe is under pressure this slide is subjected to opposed forces of this pressure and of this yieldable device.

10. Device as claimed in claim 5, wherein the main exhaust device is disposed between said supply pipe for the fluid under pressure and said chamber having a variable capacity of the retarding control device, a yieldable device being disposed in this main exhaust device for the purpose of acting, in addition to the action of the pressure prevailing in said chamber having a variable capacity, on the movable member of the main exhaust device in a direction to cause the closure of the exhaust and in opposition to the action of the pressure prevailing in said supply pipe, which acts on this movable member in a direction to cause the opening of the exhaust.

11. Device as claimed in claim 10, wherein said main exhaust device comprises a cylinder connected, on the one hand, directly to the supply pipe, that is on the upstream side of said choke aperture with respect to the direction of fluid flow, by a groove situated in the neighbourhood of the mid-part of the length of said cylinder, and, on the other hand, at one of its ends to the downstream side of said choke aperture, that is to the chamber having a variable capacity, this cylinder being, furthermore, connected to the exhaust through an aperture disposed between said groove and its other end, and, movable in this cylinder, a slide constituting said movable member and comprising a first annular groove which faces said groove in the closed position of the exhaust and which is extended by an axial passageway which is in communication with the face adjacent said other end of the cylinder, for the purpose of admitting therein the pressure of the supply pipe and a second groove which is in constant communication with this exhaust aperture and is also in communication with said groove in the exhaust position, the yieldable device being interposed between this side and the end of the cylinder which is in communication with the chamber having a variable capacity of the retarding control device.

12. Motor-transmission unit comprising in combination: a motor provided with an accelerating member, a driving shaft driven by this motor; a driven shaft; between these shafts a gear box, hydraulic actuating devices for controlling said gear box; a source of a fluid under pressure; a supply pipe for the fluid under pressure discharged by said source; a control device comprising a selector provided with a movable member for connecting this supply pipe successively to each of said actuating devices; a main exhaust device connected to said supply pipe; a retarding control device for controlling the main exhaust device so that its opening is instantaneous and its closure progressive; an auxiliary device itself controlled by said movable member of the selector, these three devices, the main exhaust device, the retarding device and the auxiliary device, being so constructed and arranged in combination that, on the one hand, the displacement of said member of the selector causes by means of said retarding control device the instantaneous opening of said main exhaust device, whereas the positioning of said member in any one of the positions corresponding to one of the engaged speeds causes the progressive closure of this main exhaust device, and an auxiliary starting device combined with said accelerating member of the motor and said main exhaust device so as to obtain that the increase in pressure in the selector when starting up and the maximum possible pressure in the actuating devices of the gear box are controlled by said accelerating member.

13. Motor-transmission unit comprising in combination: a motor provided with an accelerating member; a driving shaft driven by the motor; a driven shaft; between these shafts a gear box provided with hydraulic actuating devices for controlling said gear box; a source of a fluid under pressure; a supply pipe for the fluid under pressure discharged by said source, a control device comprising a selector including a movable member for connecting this supply pipe successively to each of said actuating devices; a main exhaust device connected to this supply pipe; a retarding control device which is adapted to control said main exhaust device so that its opening is instantaneous and its closure progressive and which comprises a chamber one of the walls of which is movable so as to vary the volume, a yieldable return device for moving this wall in a direction to decrease the volume of this chamber, a pipe between this chamber and said supply pipe, and means for creating in this pipe a choke aperture in relation to which the main exhaust device is connected in the form of a by-pass; an auxiliary device itself controlled by said movable member of the selector, these three devices, the main exhaust device, the retarding device and the auxiliary device, being so constructed and arranged in combination that, on the one hand, the displacement of said member of the selector causes by means of said retarding control device the instantaneous opening of said main exhaust device, whereas the positioning of said member in any one of the positions corresponding to one of the engaged speeds causes a progressive closure of this main exhaust device; and an auxiliary starting device combined with said accelerating member of the motor and said main exhaust device, so as to obtain that the increase in pressure in the selector when starting up and the maximum possible pressure in the actuating devices of the gear box are controlled by said accelerator member.

14. Unit as claimed in claim 13, wherein said auxiliary starting device comprises in combination: a pipe which is connected to said variable volume chamber of the retarding device and which terminates in an exhaust aperture, a valve for closing this aperture, a movable abutment, a spring 94 interposed between this abutment and this valve for applying the latter on the edge of this aperture, a unidirectional connecting means between this abutment and said accelerating member of the motor for displacing this abutment in a direction to compress said spring when said member is itself displaced in the accelerating direction, means comprising a cylinder and a piston, a pipe between these means and said supply pipe, whereby this abutment is furthermore subjected to the action of the pressure prevailing in said pipe and is displaced also in the direction to compress said spring, a closing member in said pipe, a device responsive to the speed of the driven shaft and a connection between this device and said closing member, whereby the pressure prevailing in said supply pipe is admitted in these means comprising a cylinder and piston only when the speed of said driven shaft exceeds a given minimum.

15. Unit as claimed in claim 14, wherein said starting device comprises, furthermore, means permitting an adjustable exhaust which is normally open and is connected to the supply pipe and is combined with the accelerating member of the motor so as to be progressively closed when said motor is accelerated by means of said accelerating member.

16. Unit as claimed in claim 14, wherein said starting device comprises a fixed hollow body which is connected to the exhaust and in which the pipe connected to the variable volume chamber discharges through said aperture controlled by said valve, said movable abutment comprising a slide which forms, furthermore, a piston in said body and against one of the ends of which bears a plunger connected to the accelerating member, whereas the pressure controlled by said closing member is applied in this body on said piston-slide, the latter comprising an exhaust aperture which cooperates with an aperture formed in said body and connected in the form of a by-pass to said supply pipe, and these apertures being so disposed that they intercommunicate when the accelerating member is displaced in the decelerating direction, and that the movable aperture ceases to coincide progressively with the fixed aperture when this accelerating member is moved in the accelerating direction.

References Cited in the file of this patent

UNITED STATES PATENTS

| | | |
|---|---|---|
| 1,818,910 | Sanine | Aug. 11, 1931 |
| 1,979,488 | Perez | Nov. 6, 1934 |
| 1,997,448 | Birkemeier | Apr. 9, 1935 |
| 2,062,104 | Prince | Nov. 24, 1936 |
| 2,084,153 | Linsley | June 15, 1937 |